United States Patent Office 3,810,845
Patented May 14, 1974

3,810,845
CATALYST AND PROCESS OF PREPARING
David G. Braithwaite, Carl E. Johnson, and Virgil L. Seale, Brookhaven, Miss., assignors to Nalco Chemical Company, Chicago, Ill.
No Drawing. Filed Sept. 28, 1972, Ser. No. 292,895
Int. Cl. B01j 11/40
U.S. Cl. 252—455 Z        17 Claims

ABSTRACT OF THE DISCLOSURE

A method of bonding new active catalytic surfaces on to a catalyst support in order to produce a catalyst for petroleum or petrochemical processing is described.

BACKGROUND

It is known in the art to prepare supported crystalline alumino-silicate zeolites, commonly referred to as molecular sieves, which possess a high degree of catalytic cracking activity for converting high molecular weight petroleum hydrocarbon oils to lighter material boiling in the gasoline range. It is also known in the art to use silica-based compositions as cracking catalysts and as supports for said crystalline alumino-silicate zeolites in the cracking of hydrocarbons.

Typical cracking catalysts used commercially contain about 10% by weight of said zeolites. In the normal operation of cracking processes, the catalysts decompose and produce fines which are rich in said zeolites, e.g., contain 20% to 40% by weight of said zeolites.

There is a need for a method of bonding the aforesaid crystalline alumino-silicate zeolites to the support material so as to reduce effective deactivation of the catalysts during cracking processes. There is also a need for providing a method of utilizing the zeolite fines which are usually recovered in the catalyst industry by employing devices such as wet scrubbers, electrostatic precipitators, and other recovery devices.

It is also known in the art that the ordinary silica-based cracking catalyst become deactivated after they have been on-stream for an extended duration. The activity can be partially restored by burning carbonaceous deposits from the catalyst surface, a process which is usually referred to as "regeneration." In fluid catalytic cracking, a portion of the catalyst may be regenerated continuously. However, the deactivation may be due to metal deposited on the catalyst from the oil which leads to the production of hydrogen as an undesirable by-product and eventually a catalyst, even though regenerated, may become so ineffective that it is no longer commercially feasible to use it. Hence, this used catalyst is replaced by a fresh, more active catalyst.

OBJECTS

One of the objects of this invention is to provide a new and improved process for bonding an active catalyst to a catalyst support.

Another object is to provide a method of making a reactivated catalyst by bonding a crystalline alumino-silicate zeolite to a deactivated cracking catalyst.

A further object of the invention is to provide a new and improved method for bonding catalytic components to a readily available surface without necessarily distributing them throughout the entire matrix.

An additional object of the invention is to provide new and useful cracking catalysts.

Another object of the invention is to provide new and useful results in a catalytic cracking process. Other objects will appear hereinafter.

BRIEF SUMMARY OF THE INVENTION

In accordance with the invention crystalline alumino-silicate zeolites are bonded to a catalyst support by bringing said zeolites in contact with said support in an aqueous medium containing a colloidal silica sol and a water miscible alkylene glycol, preferably ethylene glycol.

DETAILED DESCRIPTION OF THE INVENTION

In practicing the invention, the catalyst support or matrix can be porous or non-porous and catalytically active or inert. It can be a deactivated cracking catalyst or other type of synthetic, semi-synthetic or natural, solid oxide catalyst, preferably one which is predominantly silica or silica-based, e.g., silica-alumina, silica-magnesia, or silica-zirconia, compositions in a state of slight hydration and containing small amount of acidic oxide promoters in many instances. A popular natural catalyst is an acid activated montmorillonite. The synthetic matrix will ordinarily contain a substantial amount of a gel or gelatinous precipitate comprising a major proportion of silica and at least one other material such as aluminum, magnesium or zirconium oxides. Usually the synthetic gel matrix will contain about 10% to 30% alumina. One such matrix contains about 13% $Al_2O_3$ and another about 25% $Al_2O_3$ with the balance being silica. The semi-synthetic silica-based matrices are composed partially of synthetic material and partially of natural materials such as kaolinite or halloysite. One such semi-synthetic matrix contains about equal amounts of silica-alumina gel and clay. These silica-based matrices are usually both porous and amorphous. They are preferably substantially free from sodium and when initially prepared they are usually calcined at temperatures in excess of 900° F.

A wide range of aqueous colloidal silica sols can be used in practicing the invention. The ultimate particle size of the silica sol particles can range from 2 to 150 millimicrons and the surface area from 50 to 700 m.$^2$/g. The sol can vary widely in $SiO_2$ concentration, e.g., from 1% to 50% by weight as $SiO_2$.

Typical aqueous colloidal silica sols useful in preparing the catalysts of the invention are set forth below in Table I:

TABLE I

| Nalcoag | 1030 | 1034A | 1035 | 1050 | 1060 | 1130 | 1140 |
|---|---|---|---|---|---|---|---|
| Percent colloidal silica, as $SiO_2$ | 30 | 34 | 35 | 50 | 50 | 30 | 40 |
| pH | 10.2 | 3.1 | 8.6 | 9.0 | 8.5 | 10.0 | 10.0 |
| Average particle size, millimicrons | 11–16 | 16–22 | 16–22 | 17–25 | 40–60 | 8 | 15 |
| Average surface area, M$^2$/gram | 190–270 | 135–190 | 135–190 | 120–176 | 50–75 | 357 | 200 |
| Specific gravity at 68° F | 1.205 | 1.230 | 1.255 | 1.385 | 1.390 | 1.214 | 1.296 |
| Viscosity at 77° F., cps | <5 | <5 | 5 | 70 | 5–10 | 7 | 8 |
| Na$_2$O, percent | 0.4 | <0.11 | 0.10 | 0.30 | 0.10 | 0.65 | 0.40 |

In the silica sols given in Table I the liquid carrier for the $SiO_2$ particles is water but the sol can also be one in which at least a portion of the water is replaced by a water miscible alcohol or glycol. For example, Nalcoag 1129 can be used which is an acid sol generally similar to Nalcoag 1034A except that a part of the water is replaced with isopropanol so that instead of water as a liquid carrier for the $SiO_2$, the sol contains 40% to 50% isopropanol.

The crystalline alumino-silicate zeolites or molecular sieves can be any of the well known materials of this type as disclosed, for example, in U.S. Pat. 3,277,018. Other synthetic zeolites are described in detail in U.S. Pats. 2,882,244 and 3,216,789. Preferred zeolites are the synthetic alumina silicates known as molecular sieves, which have the general formula:

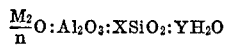
$$\frac{M_2}{n}O:Al_2O_3:XSiO_2:YH_2O$$

A preferred molecular sieve is crystalline zeolite Y, which is described in U.S. 3,130,007.

In order to optimize the activity of the finished catalysts it is desirable that they be placed in a metal form which may be certain metals of the type described in U.S. 3,236,762 or treated with one or more rare earth chlorides and then converted to the rare earth oxide form, which latter procedure provides a finished catalyst having superior activity. The use of rare earth chlorides to treat molecular sieve catalysts of the conventional type is described in U.S. 3,140,253.

The amount of zeolite placed on the catalyst to produce a good cracking catalyst may vary in amount ranging from 1% to 30%. Excellent results are achieved when the amount of zeolite ranges from 5% to 15%.

The catalyst support or matrix can be in the form of beads or spheres which usually have a diameter within the range of 0.01 inch to 0.50 inch. The zeolite particle sizes can vary and the zeolite fines will usually have a particle size within the range of 1 to 65 microns, preferably 1 to 2 microns.

The amount of silica derived from the colloidal silica sol will normally be within the range of 2% to 10%, expressed as $SiO_2$, based on the weight of the silica-based catalyst support.

It is preferable to employ ethylene glycol but other water miscible glycols including diethylene glycol, triethylene glycol, tetraethylene glycol, 1,2-propylene glycol and dipropylene glycol can be used. The amount of alkylene glycol employed is subject to variation and the amount is usually at least equal to the weight of $SiO_2$ in the colloidal silica sol. The maximum is determined primarily by economic conditions and the point where an improved bonding effect is no longer obtained. Since the alkylene glycol is distilled off during drying and calcination, it is desirable to employ only the minimum amount required to enhance the bonding, and thereby avoid the necessity for recovering large amounts of the glycol during the preparation of the catalyst.

In preparing a catalyst in accordance with the invention, the catalyst support can be mixed with the other ingredients by mulling, grinding or in any other suitable manner. Optimum results are obtained by first ball milling the alkylene glycol and the crystalline alumina-silicate zeolite together for a prolonged period, usually at least one hour, or by ball milling the alkylene glycol, the crystalline alumina-silicate zeolite and the colloidal silica sol together for a prolonged period, usually at least one hour. Freshly prepared zeolites are preferred to commercially available calcined products. The resultant mixture is then mixed with the catalyst support. The final mixture containing the catalyst support, the crystalline alumino-silicate zeolite, the alkylene glycol and the colloidal silica sol is then dried to form a catalyst product. The drying step is preferably done at a temperature of at least 180° C. for one hour. Longer drying times and higher or lower temperatures can be used. For example, the drying step might be conducted at temperatures of 30° C. to 180° C. with a longer drying time being required at the lower temperatures and a shorter drying time at the higher temperatures. The drying step removes enough moisture so that on subsequent calcining the evolution of water does not become too violent.

The catalyst product obtained after drying is then calcined to produce a catalytically active product. Calcining should be at temperatures in excess of 480° C. (Ca. 900° F.) and preferably above 538° C. (ca. 1000° F.). A temperature of 594° C. (ca. 1100° F.) achieves good results.

Since it is desirable that the finished catalyst contain a low amount of sodium, acidic silica sols such as Nalcoag 1129 and Nalcoag 1034A are preferred for the practice of the invention.

The amount of water or other water miscible carrier used with the silica particles in the colloidal silica should be sufficient so that the catalyst support and the crystalline aluminosilicate zeolite are thoroughly wet.

In order to evaluate the invention the catalysts prepared as previously described were subjected to a standard testing method in a hydrocarbon cracking process wherein heavier petroleum hydrocarbons were converted to lower boiling hydrocarbons in the motor fuel boiling range by heating them at a temperature from about 600° F. to about 1100° F. in contact with the cracking catalyst. The weight percent conversion and the volume percent conversion were noted and in some instances, the weight percent of coke and the weight percent of $C_4$ unsaturates were noted.

The invention will be further illustrated but is not limited by the following examples in which the quantities are stated in parts by weight unless otherwise indicated.

Example I

The following ingredients were used to prepare the catalyst:

| | Grams |
|---|---|
| Calcined catalyst | 1200 |
| Ethylene glycol | 440 |
| Sieve Y rare earth form | 120 |
| Nalcoag 1034A | 248 |

The calcined catalyst was an equilibrium catalyst which had been removed from catalytic cracking units after having been used to convert petroleum hydrocarbons. This was a semi-synthetic catalyst containing about 40% kaolin clay with the alumina content of the synthetic portion of the catalyst being about 25% and the $SiO_2$ synthetic portion of the catalyst being about 75%. The ethylene glycol and the Y sieve rare earth form were first ball milled together for one hour and the resultant mixture was then mixed with the calcined catalyst and the silica sol until a uniform mixture was obtained. The uniform mixture was then oven dried at 180° C., passed through a 100 mesh screen, calcined at 1100° F. and washed with water.

A typical analysis of the rare earth oxides in the Y sieve catalyst is as follows:

| | Percent |
|---|---|
| $La_2O_3$ | 40–45 |
| $Sm_2O_3$ | 3–6 |
| $CeO_2$ | 1–2 |
| $Gd_2O_3$ | 2–4 |
| $Pr_6O_{11}$ | 8–12 |
| $Y_2O_3$ | 0.2–1.0 |
| $Nd_2O_3$ | 32–37 |
| Others | 1–2 |

Example II

The procedure was the same as in Example I except that the quantity of Y sieve was one-half of the quantity used in Example I.

Example III

The procedure was the same as in Example II except that twice as much Y sieve was used. The catalyst was oven dried at 100° C. for 3 hours, dried in a furnace at 200° C. to 250° C. for 2 hours, and calcined at 1100° F. for 3 hours.

Example IV

The procedure was the same as in Example III except that one-half the quantity of Y-sieve was used.

Example V

The procedure was similar to that in Example IV except that the silica-based catalyst support was from a different source and the quantity of Y sieve was twice the quantity used in Example IV. In this case the catalyst support was a synthetic silica-alumina containing about 25% alumina and about 75% silica.

In subjecting the thus prepared catalyst after calcination and steaming to laboratory cracking evaluation studies, the following results were obtained:

|  | Weight percent | Volume percent |
|---|---|---|
| Conversion | 55.61 | 56.79 |
| Gasoline | 39.59 | 46.95 |
| Coke | 2.92 |  |
| C$_4$ unsaturates | 2.03 |  |

Example VI

In this example the catalyst was prepared by mixing 600 grams of calcined silica-based catalyst support of Example I with 130 grams ethylene glycol, 60 grams Y sieve of Example I, and 124 grams Nalcoag 1034A. The ethylene glycol was not ball milled with the sieve as in the previous examples.

Example VII

In this example 220 grams of ethylene glycol, 60 grams of Y sieve of Example I, and 124 grams of Nalcoag 1034A were ball milled together for one hour. The ball milled mixture was then hand mixed until uniform with 600 grams of silica-based equilibrium catalyst described in Example I. Then 200 grams of said equilibrium catalyst was added and mixed in slowly in 50 gram portions until the mixture was dry to the touch. It was then added to a fluidized bed of 990 grams of calcined equilibrium catalyst of the type described in Example I in 50 grams quantities while the temperature was elevated after each addition to about 104° C. over a period of about ½ hour. The product was then taken out and calcined at 500° C. for 3 hours.

After subjecting the thus prepared catalyst to laboratory cracking evaluating studies the following results were obtained:

|  | Weight percent | Volume percent |
|---|---|---|
| Conversion | 53.36 | 54.45 |
| Gasoline | 38.8 | 46.14 |
| Coke | 3.30 |  |
| C$_4$ unsaturates | 2.57 |  |

Example VIII 600 grams of a calcined silica-alumina catalyst containing about 25% alumina and about 75% silica was mixed with 60 grams Y sieve rare earth form as described in Example I, 267 grams ethylene glycol, and 52 grams Nalcoag 1034A. The amount of silica sol gave approximately 3% SiO$_2$ based on the weight of the calcined catalyst.

Cracking evaluation studies gave the following results

|  | Weight percent | Volume percent |
|---|---|---|
| Conversion | 54.16 | 55.26 |
| Gasoline | 38.19 | 45.38 |
| Coke | 3.57 |  |
| C$_4$ unsaturates | 3.03 |  |

Example IX 600 grams of calcined catalyst described in Example VIII were uniformly mixed with a previously prepared mixture of 245 grams ethylene glycol, 60 grams Y sieve rare earth form of the type disclosed in Example I, and 87 grams Nalcoag 1034A which had been ball milled for one hour. The SiO$_2$ from the silica sol was approximately 5% by weight of the catalyst charge.

Cracking evaluation studies gave the following results with this catalyst:

|  | Weight percent | Volume percent |
|---|---|---|
| Conversion | 56.2 | 57.33 |
| Gasoline | 40.04 | 47.47 |
| Coke | 3.18 |  |
| C$_4$ unsaturates | 2.80 |  |

Example X

The catalyst was prepared as in Example IX except that the ball milled mixture contained 222 grams of ethylene glycol, 60 grams Y sieve rare earth form and 124 grams Nalcoag 1034A, the amount of Nalcoag 1034A being sufficient to give approximately 7% by weight SiO$_2$ based on the catalyst charge.

Example XI 100 grams of a synthetic silica-alumina catalyst as described in Example VIII was mixed with 55.5 grams of a composition made by ball milling 53 grams Nalcoag 1034A, 220 grams ethylene glycol, and 60 grams Y sieve rare earth form for one hour. An additional 8 grams of ethylene glycol was added to the mixture which was then dried with stirring at 250° C. for 1½ hours and calcined at 1100° F. for 1½ hours.

30 grams of the dried product was suspended in enough water to make 100 ml. and the product was allowed to settle for 10 minutes. The supernatant solution indicated that very little of the sieve was washed off.

50 grams of the coated catalyst was screened through a nest of screens by rocking ten times in four directions with a 90° turn each time. All but 3.5% passed an 80 mesh screen and all but 7.0% passed a 100 mesh screen.

Example XII

The procedure was the same as in Example XI except that the amount of additional ethylene glycol added was only 4.0 grams and also 5.9 grams of Nalcoag 1034A was added so as to give a catalyst containing about 5% SiO$_2$ derived from the silica sol as compared with the 3% SiO$_2$ of Example XI.

The particle size was somewhat larger.

Similarly, a sieve coated catalyst was prepared as described in Examples XI and XII except that the quantity of additional Nalcoag 1034A was increased to 11.8 grams in order to give a catalyst containing approximately 7% SiO$_2$ derived from the silica sol. The screening distribution of this catalyst when screened in the manner described in Example XI contained a greater percentage of larger particles than the screening distribution in Examples X and XI.

The invention makes it possible to prepare improved catalysts that are useful for cracking in both fixed and moving bed cracking processes and to reactivate previously deactivated or equilibrium catalysts. In particular, it has been noted that ball milling the crystalline aluminosilicate zeolite with the colloidal silica sol for a prolonged period of at least one hour before addition to the catalyst support produces an improved catalyst.

In its broader aspects the invention is concerned with bonding a crystalline alumino-silicate zeolite to any inert support, even sand. In addition to the procedures previously described, a number of variations and modifications are possible without departing from the invention. Thus, the silica sol can contain polyglycols, gums, sugars or water soluble organic polymers. In some cases, it is desirable to add water soluble aluminum compounds, for example, aluminum chloride, water soluble aluminum salts of organic acids such as acetic acid and formic acid or chlorohydrol which is a 50% by weight solution of hydrolyzed aluminum chloride containing aluminum hydroxide and aluminum chloride usually in a ratio of about one Cl per one or two Al. Another aluminum compound which can be added is aluminum isopropoxide dissolved in ethylene glycol monoethylether by boiling to eliminate the isopropyl alcohol. Alumina gels can also be added. Thus, the invention provides a method of applying a coating to a catalyst support or a matrix which contains silica in the coating added as silica sol and alumina added as a water soluble aluminum compound or alumina gel. The invention makes it possible to provide various types of catalysts for petroleum or petrochemical processing.

In the examples previously given a typical equilibrium catalyst (sometimes referred to herein as a de-activated cracking catalyst) used as a support, when subjected to laboratory cracking evaluating studies before treatment in accordance with the invention, gave the following results:

|  | Weight percent | Volume percent |
|---|---|---|
| Conversion | 35.8 | 35.1 |
| Gasoline | 29.0 | 34.0 |
| Coke | 1.34 |  |
| C₄ unsaturates | .78 |  |

It will be seen that when these results are compared with the results obtained after treatment of the equilibrium catalyst in accordance with the invention, for instance as in Example V, the advantages of the invention are very significant, especially with respect to the percentage of conversion by weight and by volume and the percentage of gasoline produced.

The invention is hereby claimed as follows:

1. A process of preparing a catalyst which comprises intimately mixing a catalyst support with a catalytically active crystalline alumino-silicate zeolite in the presence of a silica sol and a water miscible alkylene glycol, and drying the resultant product, the quantity of said silica sol and said alkylene glycol being sufficient to bond said zeolite to said support to form a coating of said zeolite on said support.

2. A process as claimed in claim 1 in which the silica particles in said silica sol have a particle size within the range of 2 to 150 millimicrons.

3. A process as claimed in claim 1 in which said catalytically active zeolite constitutes 1% to 30% by weight of said catalyst.

4. A process as claimed in claim 1 in which said silica-based catalyst support comprises silica and alumina.

5. A process as claimed in claim 1 in which said catalytically active zeolite comprises zeolite fines having a particle size within the range of 1 to 65 microns.

6. A process as claimed in claim 1 in which the quantity of silica sol is sufficient to supply 2% to 10% by weight $SiO_2$ based on the weight of said catalyst support.

7. A process as claimed in claim 1 in which said silica sol is intimately mixed with said zeolite prior to mixing said zeolite with said catalyst support.

8. A process as claimed in claim 1 in which both said alkylene glycol and said silica sol are intimately mixed with said zeolite and the resultant mixture then mixed with said catalyst support.

9. A process as claimed in claim 1 in which said alkylene glycol is ethylene glycol.

10. A process as claimed in claim 1 in which said coating contains silica added as silica sol and alumina added as a water soluble aluminum compound or a alumina gel.

11. In a process of preparing a catalyst, the steps which comprise ball milling a silica sol and an alkylene glycol with a catalytically active crystalline alumino-silicate zeolite, thereafter mixing the resultant mixture with a silica-based catalyst support, and thereafter drying and calcining the resultant product.

12. A process as claimed in claim 1 in which said catalyst support is a deactivated cracking catalyst.

13. A catalyst obtained by the process as claimed in claim 1.

14. A catalyst resulting from the process of claim 11.

15. A catalyst resulting from the process of claim 12.

16. A process as claimed in claim 1 in which said alkylene glycol is intimately mixed with said zeolite prior to mixing said zeolite with said catalyst support.

17. A process as claimed in claim 1 in which said resultant product is dried at a temperature within the range of 30° C. to 180° C. and thereafter calcined at a temperature in excess of 480° C.

References Cited

UNITED STATES PATENTS

| 3,697,446 | 10/1972 | Braithwaite | 252—455 Z |
| 3,532,637 | 10/1970 | Zeff et al. | 252—449 X |
| 3,313,738 | 4/1967 | Rinehimer | 252—428 |

CARL F. DEES, Primary Examiner

UNITED STATES PATENT OFFICE
CERTIFICATE OF CORRECTION

Patent No. 3,810,845            Dated May 14, 1974

Inventor(s) DAVID G. BRAITHWAITE, CARL E. JOHNSON, and VIRGIL L. SEALE

It is certified that error appears in the above-identified patent and that said Letters Patent are hereby corrected as shown below:

Column 2, Table I, under the heading "1034A", the last entry " $<0.11$ " should read -- $<0.01$ --.

Signed and sealed this 26th day of November 1974.

(SEAL)
Attest:

McCOY M. GIBSON JR.           C. MARSHALL DANN
Attesting Officer              Commissioner of Patents